United States Patent [19]
Butler et al.

[11] Patent Number: 4,750,486
[45] Date of Patent: Jun. 14, 1988

[54] APPARATUS FOR MOVING A MIRROR

[76] Inventors: Philip H. Butler, 29A Clyde Road; Christopher N. Van Halewyn, 12B/14 Kirkwood Ave., both of Christchurch, New Zealand

[21] Appl. No.: 895,831

[22] Filed: Aug. 12, 1986

[30] Foreign Application Priority Data

Aug. 14, 1985 [NZ] New Zealand .......................... 213095

[51] Int. Cl.⁴ .................... A61B 17/36; G02B 26/08
[52] U.S. Cl. ......................... 128/303.1; 219/121 LQ; 219/121 LZ; 350/486; 350/634; 350/636
[58] Field of Search ..................... 128/303.1, 395–398; 219/121 LQ, 121 LZ; 350/486, 634, 636

[56] References Cited

U.S. PATENT DOCUMENTS

| | | | |
|---|---|---|---|
| 2,653,185 | 9/1953 | Lubcke et al. ........................ | 178/6.8 |
| 3,096,767 | 7/1963 | Gresser et al. ....................... | 128/395 |
| 3,402,613 | 9/1968 | Neusel et al. ..................... | 350/634 X |
| 3,459,470 | 8/1969 | Hahn ................................... | 350/636 |
| 3,565,515 | 4/1971 | de May, II ......................... | 350/296 |
| 3,879,112 | 4/1975 | Hickey ................................ | 350/288 |
| 3,914,029 | 10/1975 | Hoplock ............................. | 350/289 |
| 3,942,879 | 3/1976 | Pledger .............................. | 350/285 |
| 4,091,814 | 5/1978 | Togo ................................. | 128/303.1 |
| 4,316,467 | 2/1982 | Muckerheide ................... | 128/303.1 |
| 4,409,979 | 10/1983 | Roussel et al. ................... | 128/303.1 |
| 4,504,117 | 3/1985 | Mittelhauser ....................... | 350/636 |
| 4,583,539 | 4/1986 | Karlin et al. ...................... | 128/303.1 |
| 4,614,190 | 9/1986 | Stanco et al. ....................... | 128/395 |
| 4,644,948 | 2/1987 | Lang et al. ........................ | 128/303.1 |

FOREIGN PATENT DOCUMENTS

| | | | |
|---|---|---|---|
| 3120627 | 12/1982 | Fed. Rep. of Germany ...... | 350/636 |
| 77989 | 6/1980 | Japan .............................. | 219/121 LZ |
| 205689 | 11/1983 | Japan .............................. | 219/121 LZ |
| 816613 | 7/1959 | United Kingdom . | |
| 980525 | 1/1965 | United Kingdom . | |
| 1556473 | 11/1979 | United Kingdom . | |

Primary Examiner—Lee S. Cohen
Attorney, Agent, or Firm—Holman & Stern

[57] ABSTRACT

Apparatus for moving a plane mirror rapidly and accurately comprises: a mirror support which is mounted for pivotal movement about two non-parallel axes; and first and second moving means arranged to bear against the support to move the support about the first and second axes respectively. The apparatus may be used in combination with a laser and ancillary equipment for treating port-wine stains in human beings.

30 Claims, 3 Drawing Sheets

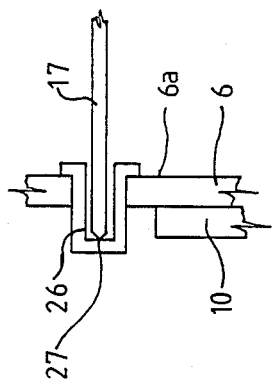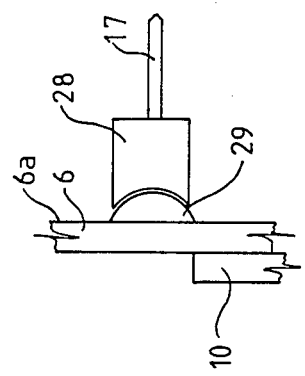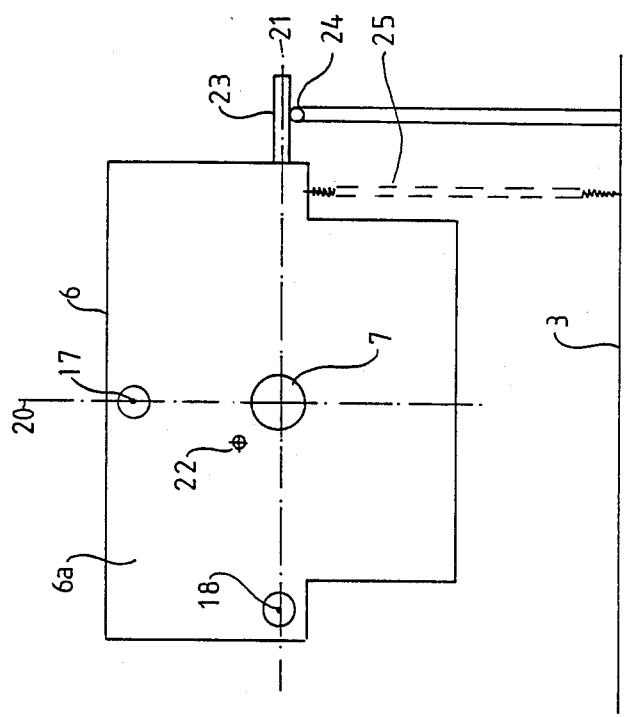

APPARATUS FOR MOVING A MIRROR

BACKGROUND OF THE INVENTION

1. Field of the Invention

The present invention relates to apparatus for moving a plane mirror, rapidly and accurately, about two non-parallel axes. The apparatus of the present invention has a number of possible applications, for example, in surveying equipment or in steering arrays of mirrors for solar heating apparatus. However, the invention is especially useful for incorporation into equipment for removing port-wine stains from human beings, and will be described with especial reference to this application.

Port-wine stains are red or purple coloured birthmarks caused by enlarged blood capillaries in the dermis of the skin. Blood collects in these enlarged capillaries, causing a red or purple pigmented area which is clearly visible on the surface of the skin. Port-wine stains are a fairly common congenital defect, and if large and present on the face or neck, they can be very disfiguring. One of the most effective ways of removing port-wine stains has proved to be treatment with a laser. The laser is selected so that its wavelength is one which is preferentially absorbed by the haemoglobin of the blood, so that when the laser is directed onto the epidermis covering the port-wine stain, the haemoglobin is preferentially heated by the laser and the surrounding tissue remains comparatively unheated. The heating of the haemoglobin heats the nearby endothelial cells of the capillary wall, and the cells rupture, causing the capillary to collapse. The body's normal recuperative mechanisms repair the capillaries, or bypass the blocked capillary with new, normal size capillaries. The repaired capillaries are of decreased diameter due to scarring of the surround tissues. The scarring itself is too slight to be visible through the eipdermis, and since the new 'bypass' capillaries and the repaired capillaries are of normal or near-normal diameter, the port-wine stain is greatly lightened. The treatment is repeated until the port-wine stain matches the normal skin colour. In the above-described treatment, the laser beam must be controlled very precisely, so as not to damage normal skin or over-treat any part of the port-wine stain. Hitherto, the laser beam has been directed onto the skin by a fibre-optics cable which the surgeon moves over the port-wine stain. Unfortunately there is a considerable power loss associated with the use of a fibre-optic cable, and the cable also spoils the collimation of the laser beam. A further drawback is that manually moving the end of the cable over the patient is slow and can be very time-consuming if a large port-wine stain is to be treated. It is therefore an object of the present invention to provide apparatus for directing a laser beam very accurately, but without using a fibre-optics cable.

DESCRIPTION OF THE PRIOR ART

U.S. Pat. No. 3,565,515 discloses a mount for an optical element (in particular a part-spherical mirror) in which the mirror is supported from a mount by a central plug which passes through the optical centre of the mirror and upon which the mirror can pivot relative to the mount, to a limited degree. The mirror is spring-biassed tightly into engagement with the plug. Adjustment screws are located between the mount and the non-reflecting surface of the mirror, and movement of these screws causes the mirror to tilt relative to the mount, pivoting on the plug.

This apparatus is essentially a static mirror mount i.e. designed to hold a mirror in a fixed position, with provision for occasional manual adjustments of that position, using the adjusting screws. Thus, the apparatus is not suited to providing for frequent rapid movements of the mirror. A further drawback is that the plug must lie on the optical centre of the mirror and thus encroaches on the reflective surface of the mirror. Yet another drawback is that the adjusting screws bear on the back of the mirror itself:- this can stress the mirror and cause distortion and/or damage.

BRIEF SUMMARY OF THE INVENTION

An object of the present invention is the provision of apparatus for moving a mirror which overcomes the drawbacks of the prior art and which is relatively inexpensive to manufacture and maintain.

The apparatus of the present invention is capable of rapid and accurate movement: typically, movements from one position to the next are made in times of the order of one-thousandth of a second, directing a laser beam with an accuracy of fractions of a millimetre at distances of 1 meter from the mirror.

The present invention provides apparatus for moving a mirror, said apparatus comprising: a mirror support arranged to support a plane mirror such that the mirror moves as one with the support; said support being mounted for pivotal movement about two non-parallel axes; a first moving means arranged to bear against the mirror support such that movement of said first moving means pivots said support about one of said axes; and a second moving means arranged to bear againt the mirror support such that movement of said second moving means pivots said support about the other of said axes.

Preferably, said axes are mutually perpendicular. The axes may lie in the plane of the support, or, for maximum accuracy, may lie in the plane of the reflective surface of the mirror.

Preferably, the support is pivotally mounted upon a ball and socket joint the ball of which comprises a part-sphere the flat surface of which is rigidly secured to the surface of the support opposite to that supporting the mirror and the radius of said part-sphere is such that the centre of the sphere of which said part-sphere forms a segment lies on the reflective surface of the mirror. One pivot axis comprises a line connecting the centre of said flat surface of said part-sphere and the point at which said first moving means bears against the mirror support; and the other pivot axis comprises a line connecting the centre of said flat surface of said part-sphere and the point at which said second moving means bears against the mirror support.

The present invention further provides apparatus for treating port-wine stains comprising apparatus for moving a mirror, as described above, in combination with a laser arranged so that in use light from said laser falls upon, and is reflected by, said mirror.

Said apparatus for treating port-wine stains may also include a dichroic filter, a video camera, and a lens, arranged so that in use light from the laser is wholly or partly reflected by the dichroic filter, passes through the lens to fall upon the mirror, and is reflected onto a patient; any light reflected or re-emitted from the patient which passes back towards the mirror is reflected by the mirror back through the lens and the dichroic filter to the video camera.

BRIEF DESCRIPTION OF THE DRAWINGS

By way of example only, a preferred embodiment of the present invention is described in detail, with reference to the accompanying drawings, in which:

FIG. 2 is a view taken in the direction of arrow A of FIG. 1;

FIGS. 3 and 4 are plan views of variation of the equipment shown in FIG. 1; and

DETAILED DESCRIPTION OF A PREFERRED EMBODIMENT OF THE INVENTION

Figure 1:
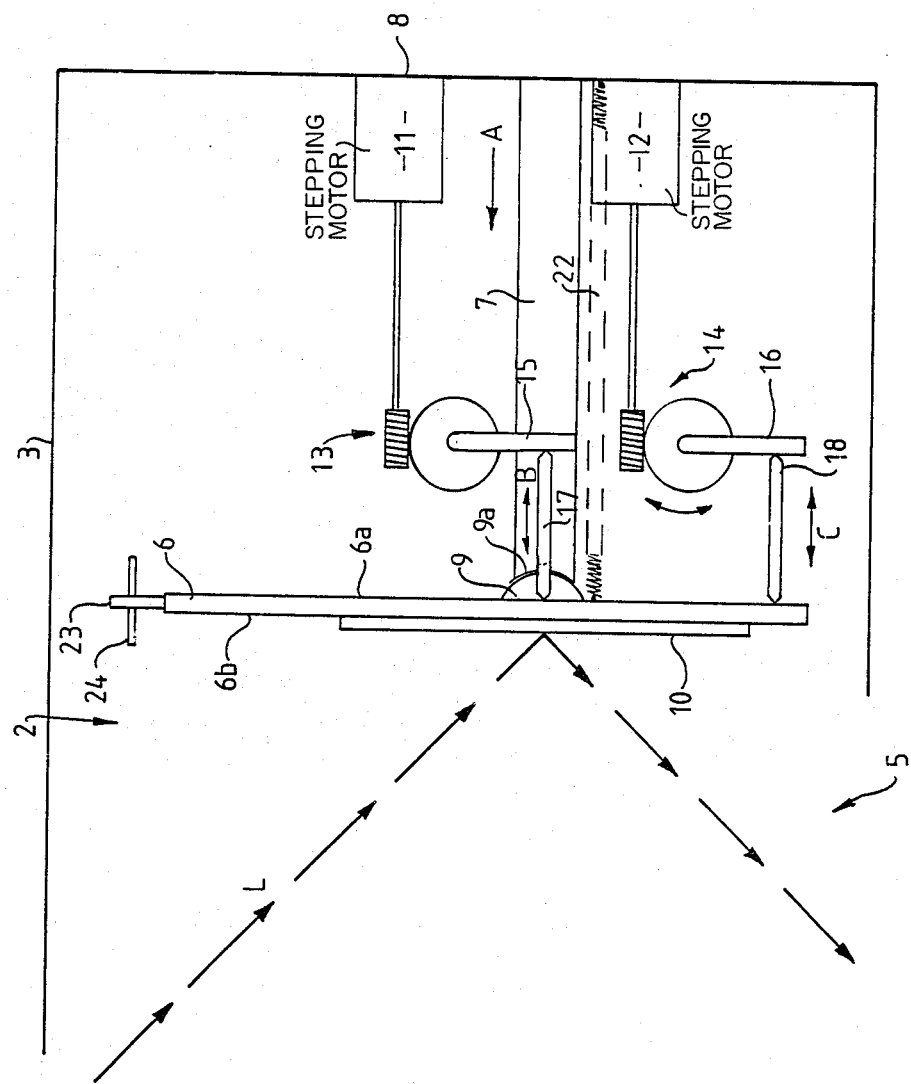
FIG. 1 is a plan view of equipment incorporating the present invention.

Referring to the drawings, equipment 2 for accurately directing a laser beam comprises a base plate 3 across which a mirror support 6 is mounted diagonally. The support 6 comprises a plate mounted clear of the floor of the housing, supported only by a support rod 7 which extends horizontally from an anchor plate 8 which is rigidly secured to the base plate 3.

The outer end of the support rod 7 provides a part-spherical socket 9a, and part of a sphere 9 is rigidly secured to the centre of one face 6a of the support 6. The part-sphere 9 is received in the socket in the manner of a ball-and-socket joint, so that the support 6 can pivot relative to the rod 7. The radius of the part sphere 9 is selected such that the centre of the sphere of which the part-sphere 9 forms a segment falls on the reflecting surface of a plane mirror 10 which is rigidly secured to the support 6.

The mirror 10 preferably is a front-surfaced mirror for optimum reflectivity and to minimise back-reflections of the laser beam. The mirror is mounted with its rear surface flat against the other face 6b of the support 6, and is rigidly secured thereto so that support and mounted mirror move as one. The support 6 and mirror 10 are arranged to be moved by ±10° relative to the central position which is a vertical plane inclined at 45° to the incoming laser beam L.

The motion is controlled by two identical stepping motors, 11, 12 which are mounted on the floor of the housing 3, facing said one face 6a of the support 6.

Each stepping motor 11, 12, is arranged to drive the worm of a worm/worm-wheel drive 13,14, and a shaft 15, 16 is rigidly secured radially across the wheel, with the outer end of shaft 15, 16 protruding beyond the edge of the wheel and engaged with one end of a Cambridge link 17, 18 the other end of which engages said face 6a of support 6. A Cambridge link comprises a spoke pointed at each end. One of the Cambridge links 17 engages the face 6a at a point remote from the part-sphere 9 and lying on a vertical axis 20 (shown as a broken line) which bisects the part-sphere 9. Movement of link 17 in the directions of arrows B will pivot the support 6 and mirror 10 in a vertical plane, about a horizontal axis 21.

The other Cambridge link 18 engages the face 6a at a point remote from the part-sphere 9 and lying on the horizontal axis 21 which bisects the part-sphere 9 and is perpendicular to the axis 20. Movement of the link 18 in the directions of arrows C will pivot the support 6 and mirror 10 in a horizontal plane about the axis 20.

The axes 20 and 21 are depicted as respectively vertical and horizontal and mutually perpendicular. However, it will be appreciated that the axes need not be vertical or horizontal, and need not be mutually perpendicular: it is sufficient that the axes are inclined to each other at an angle i.e. are not parallel.

For some applications, it may be desirable to optimize the accuracy of the mirror movements caused by the motors 11 and 12 i.e. to ensure that movement of the motor 11 causes rotation of the reflecting surface of the mirror about axis 21 only, with no component of movement whatever about axis 20, and similarly that movement of motor 12 causes rotation of the reflecting surface of the mirror about axis 20 only, with no component of movement whatever about axis 21. To achieve this, the axes 20, 21 must lie in the plane of the reflecting surface of the mirror 10. This may be achieved in a number of ways, for example, as shown in FIGS. 3 and 4.

Referring to FIG. 3, the surface 6a of the support 6 is recessed at the points of contact of the links 17 and 18; only one such recess 26, for link 17, is shown. The recess 26 is dimensioned such that the point 27 of contact between the link 17 and the recess 26 lies in the plane of the front (i.e. reflective) surface of the mirror 10. The recess for link 18 is made in the same way. Thus, the axes 20 and 21 lie on the reflective surface of the mirror.

Another possibility is shown in FIG. 4, in which the end of each link 17, 18 is formed with a part-spherical socket (only one of which, 28, is shown) and the support surface 6a has a part-spherical surface 29 secured thereto, the radius of the sphere of which the surface 29 forms a part being such that the centre of said sphere lies on the front surface of the mirror 10 and hence the corresponding axis 21 lies on said front surface of the mirror also. The link 18 is formed in the same manner as the link 17, such that the axis 20 lies on said front surface also. A tension spring 22 is secured between the face 6a of the support 6 and the anchor plate 8, said spring being arranged to bias the part-sphere 9 into contact with the socket 9a and the face 6a into contact with the links 17 and 18, with the mirror lying in a vertical plane and inclined at 45° to the incoming laser beam L.

To prevent the support 6 from rotating about the part-sphere 9 in the plane of the support, the support is stabilized by two polished, low-friction pins 23, 24. One pin 23 is rigidly secured to the support 6 on the axis 21 so as to project outwards from the side of the support, in the plane of the support. The other pin 24 is rigidly mounted upon the base plate 3, with the longitudinal axis of the pin 24 perpendicular to that of the pin 23, and the lower surface of the pin 23 in contact with the upper surface of the pin 24. A tension spring 25 is connected between the support 6 adjacent the pin 23, and the base plate 3, so as to bias the pins 23, 24 into contact with each other. When the support 6 is moved by the motors 11, 12, the pins 23, 24 slide over each other and do not restrict movement about the axes 20 and 21, but prevent the support 6 from rotating in its own plane.

It will be appreciated that the stepping motor and the associated drives and linkages may be arranged to contact either face of the support, or with one stepping motor at one face of the support and the other stepping motor at the other. The only requirement is that one stepping motor and the associated drives and linkages is arranged to move the support and mirror about a first axis, and the other stepping motor and the associated drives and linkages is arranged to move the support and mirror about a second axis at an angle (preferably 90°) to said first axis.

Any suitable drives and linkages may be substituted for those described above or a nut on the threaded shaft of each stepping motor may be arranged to make direct contact with the support 6. If the stepping motors are positively connected to the support, rather than simply contacting the support (directly or indirectly) the spring 22 is unnecessary.

Figure 5:
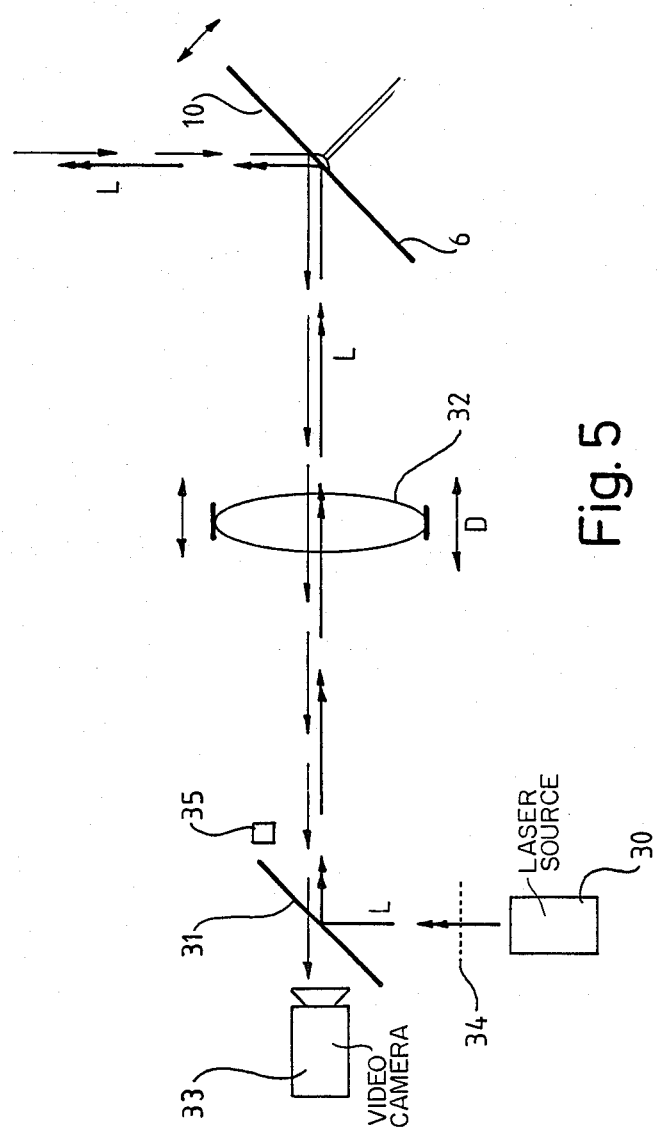
FIG. 5 is a plan view showing the path of light through the equipment of FIG. 1 and through associated equipment.

Referring now to FIG. 5, a laser source 30 produces a beam of light L which is turned through 90° by a dichroic filter 31 which also acts as a mirror. The dichroic filter 31 is inclined at 45° to the incident laser beam. The dichroic filter 31 is an interference filter which reflects substantially only one colour of light. The laser beam L reflected by the filter 31 then passes through an aspheric achromatic convex doublet lens 32 of known type; the lens 32 is arranged to be movable along its optical axis (arrows D) preferably under computer control. The laser beam L then is reflected by the movable mirror 10, and is turned through an angle which depends upon the angle of the mirror 10, and the reflected beam falls on the patient, as hereinafter described.

A video camera 33 is located behind the dichroic filter 31 (i.e. on the side of the filter opposite to that on which the laser impinges). The lens 32 forms part of the optical system of the video camera, and the lens 32 is moved along its optical axis until the video camera is focussed. The dichroic filter does not obscure the video camera (except to filter out one colour of light) and so the camera can be directed onto the patient in the same manner as the laser beam; i.e. once the lens 32 and video camera are positioned correctly, the video camera always sees the focus position of the laser in a fixed position within the field of view. Thus the video camera may be used to predict the exact position of the focus of the laser. Preferably the optical system also includes means for measuring either the light reflected from the patient's skin, or the fluorescence of the blood during treatment, or both. For this purpose, a light detector 35, e.g. a p.i.n. diode or a photomultiplier tube, is mounted adjacent the front surface of the dichroic filter.

The above described equipment is used as follows: The preferred type of laser is a pulsed copper-vapour laser which emits green light and yellow light in a pulsed beam. Yellow light is preferred for the treatment of port-wine stains, because yellow light is absorbed more by the blood than by the melanin, and hence heats the blood rather than the upper skin when it impinges on a patient.

Alternatively, a continuous (i.e. non-pulsed) laser may be used, as hereinafter described. If a laser emitting a different colour of light is used, then the dichroic filters must be selected appropriately, so that filter 34 filters out all but one colour of light, and filter 31 reflects only said one colour.

For example, one suitable laser produces about 8 watts yellow light, about 12 watts green light, in a pulsed beam about 38 mm in width, with a pulse length of about 50 nano-seconds at about 10 kilohertz, with 100 microseconds between consecutive pulses. The laser beam is passed through a preliminary dichroic filter 34 selected to filter out the green light, so that the beam which impinges on the dichroic filter 31 is predominently yellow. In this case, the dichroic filter 31 is a filter selected to reflect substantially only yellow light, so the yellow light impinging on the dichroic filter 31 is reflected by the filter.

The patient whose port-wine stain is to be treated is positioned near the exit side of the housing 3, with the port-wine stain facing said exit side. Depending upon the patient's sensitivity and the size of the port-wine stain, the patient may need to be anaesthetised. With the laser switched off, the video camera 33 is switched on, and the lens 32 is moved along its optical axis until the video camera is focussed correctly on the port-wine stain. The stepping motors 11, 12 are then operated, (if necessary) to move the mirror 10 so that the video camera sees around the periphery of the port-wine stain. This picture is transmitted from the video camera to a control computer which is programmed to 'map' the port-wine stain and then to calculate the movements of the stepping motors 11, 12 which will be needed to expose every part of the stain to the laser beam once only, for the required time of treatment. When these calculations have been completed, the laser is switched on, and is moved over the port-wine stain systematically, with the computer programme controlling the stepping motors 11, 12 and hence the movements of the mirror 10. When the whole area of the stain has been treated, the laser is switched off.

It is advantageous (although not essential) to be able to monitor the effectiveness of the laser treatment.

The effectiveness of the treatment can be measured by measuring the blanching of the port-wine stain and-/or by measuring the changes in blood fluorescence during treatment.

When part of a port-wine stain is treated, the colour of the stain is blanched, the paler the skin, the more light the skin reflects, so blanching can be measured by measuring the light reflected from each area of the stain as that area is treated.

During treatment, some of the light reflected from the area under treatment is scattered back towards the mirror 10, and is duly reflected back towards the video camera, where it is detected by the light detector 35.

Alternatively, or additionally, the treatment's effectiveness may be measured by measuring changes in blood fluorescence: some of the energy put into the blood in the treated area by the laser is re-emitted as fluorescence, and the level of fluorescence can be used as a measure of the amount of energy put into that area, and hence of the treatment's effectiveness. Part of the fluorescence is reflected back towards the video camera and detected by the light detector 35, as described above.

If both blanching and fluorescence are to be measured, it is of course necessary to differentiate between the two sets of readings received by the light detector. This can be done in two ways: one light detector is used to sense the reflected light and another to sense the re-emitted light, since the reflected light has a different wavelength to the re-emitted light, and the light detectors are selected to sense different wavelengths. Alternatively, a single light detector may be used and the two sets of readings differentiated by the fact that the blanching measurement is made while the laser is on, i.e. during the relatively short laser pulse; and the fluorescence occurs while the laser is off i.e. during the relatively long gaps between consecutive laser pulses. If a continuous laser is used a beam chopper of known type may be used to interrupt the laser beam to provide gaps in which fluorescence may be measured.

The light detector is linked to the computer, so that information on the effectiveness of the treatment for a particular area is received during, or just after, treatment, so that further treatment can be given at once if necessary.

The reflected/re-emitted light sensed by the light detector would damage the video camera if it reached the camera, but since this light is yellow light, the dichroic filter 31 reflects this light rather than transmitting it, and so protects the camera.

If separate light detectors are used to detect fluorescence and blanching, then the detector to detect the fluoresence may be located on the same side of the dichroic filter as the video camera, since the re-emitted light is of a different wavelength and is not reflected by the dichroic filter.

We claim:

1. Apparatus for moving a mirror, said apparatus comprising: a plane mirror; a mirror support supporting said mirror such that the mirror moves as one with the support, said support being mounted upon a support rod for pivotal movement about two mutally perpendicular axes; a connection between said support and support rod comprising a ball and socket joint having a ball which consists of a part-sphere with a flat surface rigidly secured to a surface of the support opposite a surface on which the mirror is supported, and the radius of said part-sphere is such that the center of the sphere of which said part-sphere forms a segment lies on the reflective surface of the mirror; a first moving means arranged to bear against the mirror support such that movement of said first moving means pivots said support about one of said axes; and a second moving means arranged to bear against the mirror support such that movement of said second moving means pivots said support about the other of said axes; said one axis comprising a line connecting the center of said flat surface of said part-sphere and the point at which said first moving means bears against the mirror support; and the other axis comprising a line connecting the center of said flat surface of said part-sphere and the point at which said second moving means bears against the mirror support; and means for preventing the support from rotating in the plane of the support wherein said means for preventing rotation comprises a first pin rigidly secured to the support so as to project outwardly therefrom, the longitudinal axis of the pin being aligned with one of said pivot axes and lying in the plane of the support; a second pin in sliding contact with the first pin, the longitudinal axis of the second pin being substantially perpendicular to that of said first pin; and means for resiliently biassing the first pin into contact with the second pin.

2. Apparatus for treating port-wine stains, comprising: apparatus for moving a mirror, said apparatus comprising: a plane mirror; a mirror support supporting said plane mirror such that the mirror moves as one with the support; said support being mounted for pivotal movement about two non-parallel axes; a first moving means including a first element which bears against the mirror support such that movement of said first moving means pivots said support about one of said axes without pivotal movement of said first element; and a second moving means including a second element which bears against the mirror support such that movement of said second moving means pivots said support about the other of said axes without pivotal movement of said second element; a laser arranged in relation to said mirror so that in use light from said laser falls upon, and is reflected by, said mirror; a dichroic filter located between said laser and said mirror such that light emitted by the laser in use is wholly or partially reflected by the dichroic filter, said reflected light being directed towards the mirror; and a video camera located on the side of the dichroic filter opposite to the mirror such that light reflected by the mirror back towards the dichroic filter must pass through the dichroic filter before reaching the video camera.

3. Apparatus as claimed in claim 2 wherein said axes are mutually perpendicular.

4. Apparatus as claimed in claim 2 wherein said axes lie in the plane of the reflective surface of the mirror.

5. Apparatus as claimed in claim 4 wherein the front surface of the mirror is the reflective surface.

6. Apparatus as claimed in claim 2 further comprising means for preventing the support from rotating in the plane of said support.

7. Apparatus as claimed in claim 6 wherein said means for preventing rotation comprises a first pin rigidly secured to the support so as to project outwardly therefrom, the longitudinal axis of the pin being aligned with one of said pivot axes and lying in the plane of the support; a second pin in sliding contact with the first pin, the longitudinal axis of the second pin being substantially perpendicular to that of said first pin; and means for resiliently biassing the first pin into contact with the second pin.

8. Apparatus as claimed in claim 2 which includes a support rod and a ball and socket joint mounting said support for pivotal movement upon the support rod.

9. Apparatus as claimed in claim 8 wherein the ball of the ball and socket joint comprises a part-sphere with a flat surface rigidly secured to a surface of the support opposite to a surface upon which the mirror is supported; and the radius of said part-sphere is such that the centre of the sphere of which said part-sphere forms a segment lies on the reflective surface of the mirror.

10. Apparatus as claimed in claim 9 wherein one pivot axis comprises a line connecting the centre of said flat surface of said part-sphere and the point at which said first element bears against the mirror support; and the other pivot axis comprises a line connecting the centre of said flat surface of said part-sphere and the point at which said second element bears against the mirror support.

11. Apparatus as claimed in claim 10 wherein the support is biassed into engagement with said first and second elements, and the ball of the ball and socket joint is biassed into engagement with the socket of said joint, by a spring.

12. Apparatus as claimed in claim 2 wherein each of said moving means includes a stepping motor.

13. Apparatus as claimed in claim 12 wherein each of said moving means comprises a stepping motor arranged to drive a worm/worm-wheel drive and the wheel of each worm/worm-wheel drive carries a shaft radially and rigidly attached thereto, said shaft being engaged with one end of a Cambridge link defining the respective element, the other end of which element engages said support.

14. Apparatus as claimed in claim 13 wherein each portion of the support which is engaged by the respective Cambridge link is recessed such that each point of contact between said support and each said Cambridge link lies in the plane of the reflective surface of the mirror.

15. Apparatus as claimed in claim 13 wherein the end of each Cambridge link which contacts the support is formed as a socket of a ball and socket joint and each corresponding ball comprises a part-sphere with a flat surface rigidly secured to the support, the radius of each said part-sphere being such that the centre of the sphere of which said part-sphere forms a segment lies on the reflective surface of the mirror.

16. Apparatus as claimed in claim 2 further comprising a convex lens located between the video camera and the mirror, said lens forming part of the optical system of the camera and being movable along its optical axis to alter the focus of the camera.

17. Apparatus as claimed in claim 16 further comprising a light detector arranged adjacent the dichroic filter on the same side of said filter as the mirror, said light detector being arranged to detect light reflected by the mirror back towards the laser.

18. Apparatus as claimed in claim 17 wherein said light detector is a p.i.n. diode.

19. Apparatus as claimed in claim 17 wherein said light detector is a photomultiplier tube.

20. Apparatus as claimed in claim 2 wherein said laser is a pulsed laser.

21. Apparatus as claimed in claim 20 wherein said laser is a copper-vapour laser.

22. Apparatus as claimed in claim 2 wherein said laser is a continuous laser in combination with a beam chopper.

23. Apparatus for treating port-wine stains comprising apparatus for moving a mirror, said apparatus comprising: a plane mirror; a mirror support supporting said plane mirror such that the mirror moves as one with the support, said support being mounted upon a support rod for pivotal movement about two mutually perpendicular axes; a connection between said support and support rod comprising a ball and socket joint having a ball which consists of a part-sphere with a flat surface rigidly secured to a surface of the support opposite another surface of the support on which the mirror is supported, and the radius of said part-sphere is such that the centre of the sphere of which said part-sphere forms a segment lies on the reflective surface of the mirror; a first moving means including a first element which bears against the mirror support such that movement of said first moving means pivots said support about one of said axes without pivotal movement of said first element; and a second moving means including a second element which bears against the mirror support such that movements of said second moving means pivots said support about the other of said axes without pivotal movement of said second element; said one axis comprising a line connecting the center of said flat surface of said part-sphere and the point at which said first moving means bears against the mirror support; and the other axis comprising a line connecting the centre of said flat surface of said part-sphere and the point at which said second moving means bears against the mirror support; and means for preventing the support from rotating in the plane of the support; a laser arranged in relation to said mirror so that in use light from said laser falls upon, and is reflected by said mirror and a dichroic filter located between said laser and said mirror such that light emitted by the laser in use in wholly or partially reflected by the dichroic filter, said reflected light being directed towards the mirror; and a video camera located on the side of the dichroic filter opposite the mirror such that light reflected by the mirror back towards the dichroic filter must pass through the dichroic filter before reaching the video camera.

24. Apparatus as claimed in claim 23 wherein each of the said moving means includes a stepping motor.

25. Apparatus as claimed in claim 23 further comprising a convex lens located between the video camera and the mirror, said lens forming part of the optical system of the camera and being movable along its optical axis to alter the focus of the camera.

26. Apparatus as claimed in claim 23 further comprising a light detector arranged adjacent the dichroic filter said light detector being arranged to detect reflected and/or re-emitted light reflected by the mirror back towards the laser.

27. Apparatus as claimed in claim 26 wherein said light detector is a p.i.n. diode.

28. Apparatus as claimed in claim 26 wherein said light detector is a photomultiplier tube.

29. Apparatus as claimed in claim 23 wherein said laser is a pulsed laser.

30. Apparatus as claimed in claim 29 wherein said laser is a copper-vapour laser.

* * * * *